Patented Oct. 22, 1940

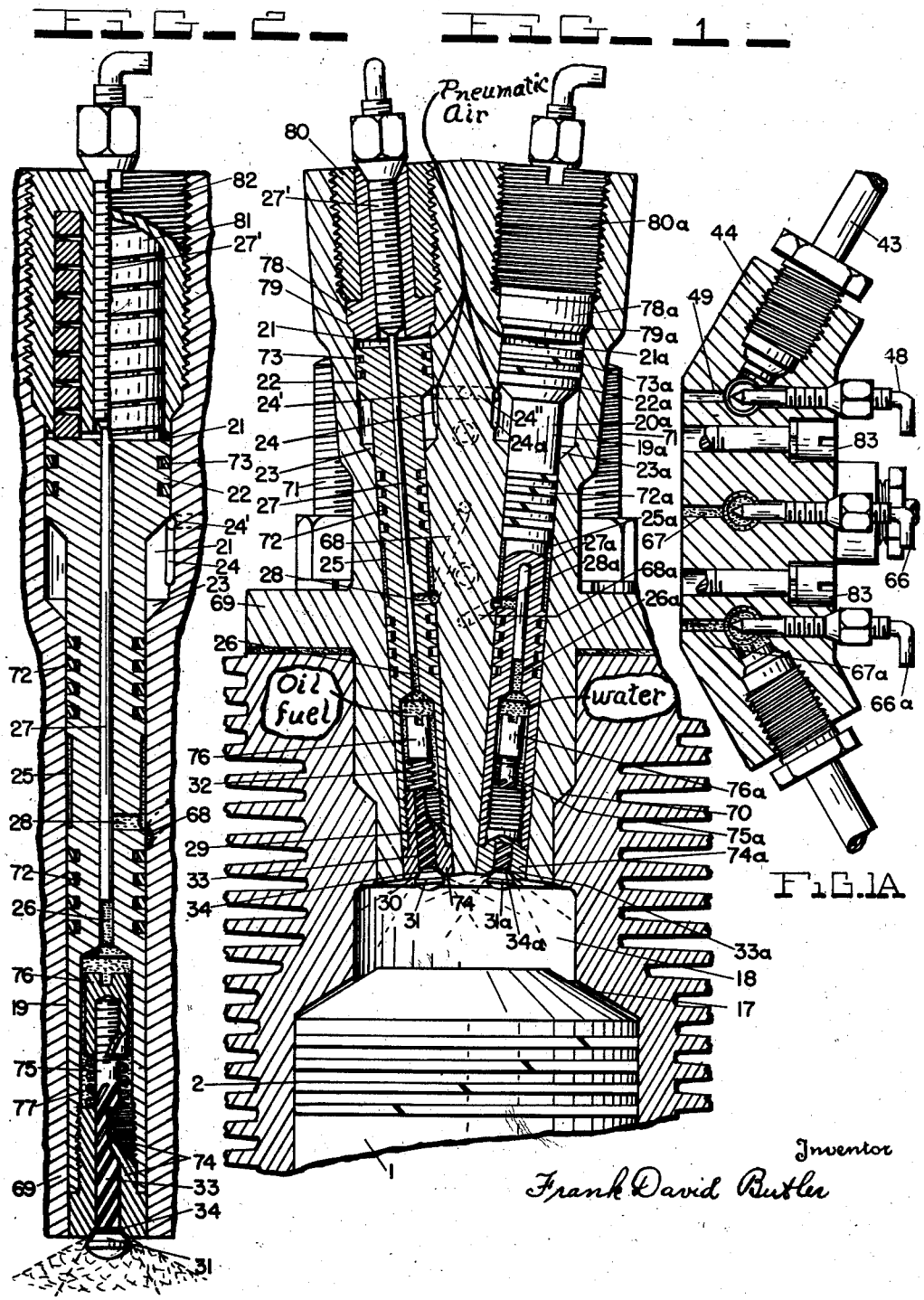

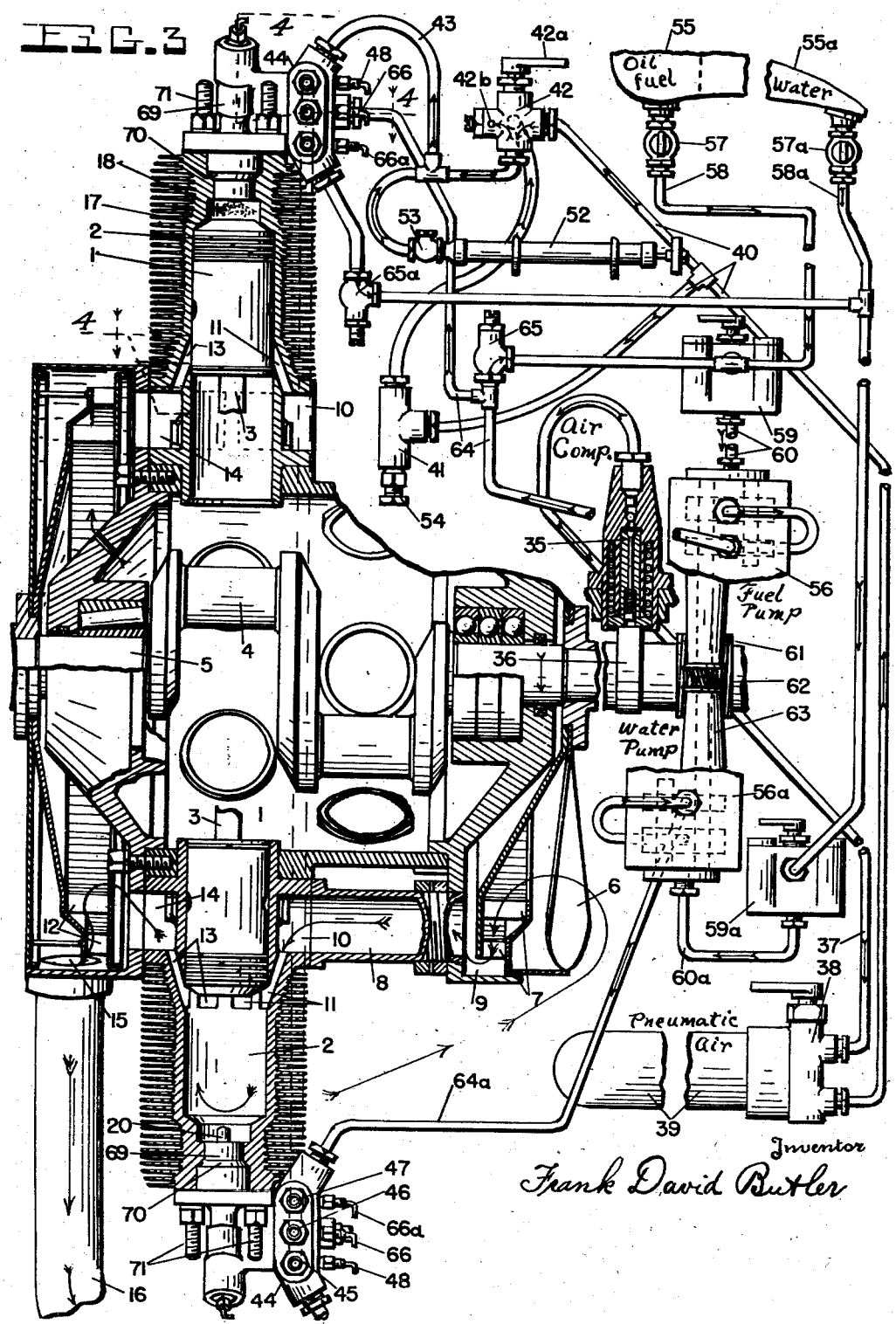

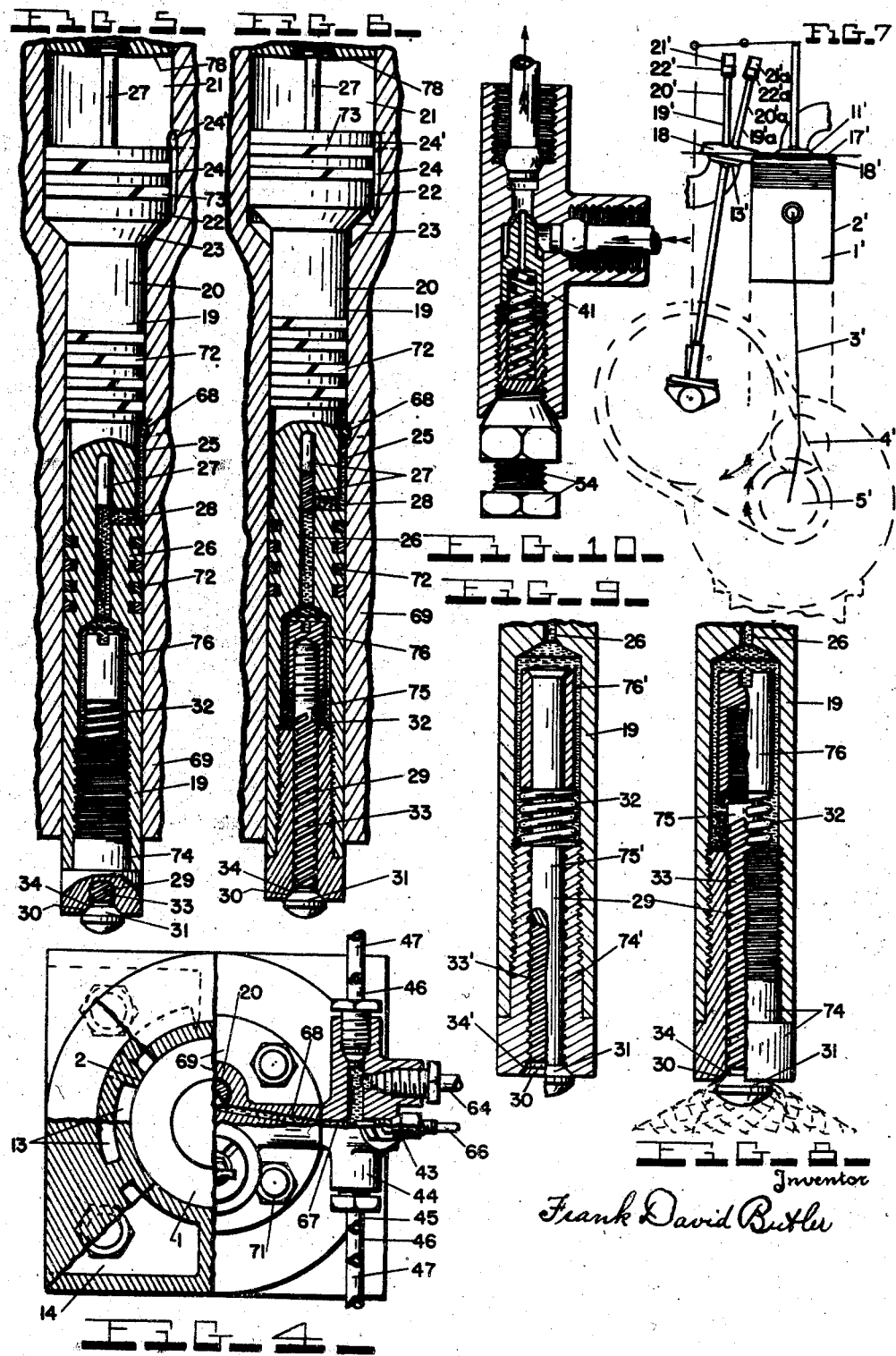

2,218,522

UNITED STATES PATENT OFFICE 2,218,522

INTERNAL COMBUSTION ENGINE

Frank David Butler, United States Navy

Application January 21, 1938, Serial No. 186,057

2 Claims. (Cl. 123—25)

(Granted under the act of March 3, 1883, as
amended April 30, 1928; 370 O. G. 757)

My present invention relates to combustion engines, more particularly of the type wherein the fuel is injected into the cylinder or cylinders of such engine and in which the fuel is ignited during such injection by the intense heat generated in the combustion supply air charge during the period the latter is being highly compressed at or near the completion of the compression cycle period of operation of such engine. The solution of the major problem of burning fuel efficiently, in such type of engine, with its many minor resulting problems, has been long and vainly sought by many in this art.

The major concept of my present invention is the solution of said problem and the provision of simple, durable, efficient and relatively inexpensive means for its practical and commercial accomplishment.

More specific concepts of my invention contemplate (a) the provision of relatively inexpensive and efficient means for minutely atomizing, highly agitating, and injecting the fuel charge into each cylinder; (b) the provision of means for effecting very beneficial turbulence or violent agitation of the compressed air charge within the combustion chamber or space of each cylinder prior to, during and immediately succeeding the injection therein of the fuel and water charges and the resulting combustion of said air and fuel charges, and also of beneficially locating said combustion chamber in relation to the fuel and water atomizers and the bore of the engine cylinder so that said air and fuel charges will, prior to and during the initial combustion thereof, be confined in a relatively small space immediately surrounding said atomizers and preferably directly outward of the center of the engine piston head; (c) the provision of relatively inexpensive and efficient means for minutely atomizing, highly agitating, and injecting the water charge into each cylinder and of so locating the water atomizer in relation to the fuel atomizer that the injection path of flow of the water charge will follow in the same general direction of travel as the path of flow of the fuel charge; (d) the provision of an effective and efficient singly controlled pneumatic means for measuring the quantity of water injection in direct proportion to the quantity of fuel injection, for varying the maximum volume of fuel and water that may be injected into each cylinder and the timing of such fuel and water injections and consequently the speed of the engine; and (e) the provision of means and combinations of elements comprising new and useful entities which will more clearly appear, and be understood by those skilled in this art, from the accompanying drawings and the following description, and appended claims.

It will be readily appreciated by those skilled in this art, after understanding my invention, that various changes may be made in the means disclosed herein which will produce the same results in substantially the same manner without digressing substantially from my inventive concept or sacrificing any of its outstanding inherent advantages, and that any number of cylinders may comprise an engine.

Fig. 1 is a central vertical section through one cylinder of the internal combustion engine of this invention.

Fig. 1A is a transverse section of one manifold fitting.

Fig. 2 is an enlarged sectional view of a modified form of injector unit.

Fig. 3 is a partly diagrammatic and partly sectional view of a two-cycle radial engine to which this invention has been applied.

Fig. 4 is a sectional view on line 4—4 of Fig. 3.

Fig. 5 is a sectional view of an injector unit in the position prior to the injection action.

Fig. 6 is a view similar to Fig. 5 with the injection action partly commenced.

Fig. 7 is a diagrammatic view of the invention applied to a four-cycle engine.

Fig. 8 is an enlarged view of the lower portion of Fig. 6.

Fig. 9 is a modified form of the portion shown in Fig. 8; and,

Fig. 10 is a sectional view of an air reducing valve.

In the drawings, in which the same reference characters indicate the same parts, Figs. 3 and 7, diagrammatically represent respectively the preferred application of my present invention to the typical two, and four stroke cycle types of internal combustion engines.

In Fig. 3 the usual power piston 1 of each cylinder 2, of such engine, is connected by the usual connecting rod 3 to its respectvie crank 4 of the crank shaft member 5. The air charge for combustion is supplied to the cylinder 2 (as diagrammatically illustrated in the lower portion of Fig. 3), from the outside atmosphere, under a slight pressure, by and via the fan 6 and compounded blower 7, which are both secured to the crank shaft 5 and operated thereby, into the inlet pipe 8, connecting the blower housing 9 and the inlet recess 10, and thence through said inlet recess 10, in the body portion of the cylinder 2, into the cylinder 2, outward of the piston 1, via the diagonally broached inlet ports 11 in the walls of said cylinder. Simultaneously during the period the air charge is being admitted into the one side of the cylinder 2, the expended or exhaust gases are being educted, from the opposite side of said cylinder, under a slight vacuum, by the compounded induced draft exhaust blower 12 which latter is secured to and operated by the crank shaft 5, the path of flow of these waste gases being from the cylinder 2 via the diagonally broached exhaust ports 13, in the walls of said cylinder, into the exhaust recess 14, located in the lower portion of the cylinder body, thence via the exhaust blower housing 15 into said compounded induced draft exhaust blower 12, and thence via said exhaust blower housing 15 into the exhaust outlet pipe 16, secured to said blower housing 15, and to the atmosphere, all substantially as diagrammatically illustrated in Fig. 3.

Starting with the moving elements of the engine at rest, in the position in which they are illustrated in Fig. 3, and assuming that the crankshaft 5 is rotated by some outside means (not illustrated) and that the piston 1 is advanced, outward in the cylinder 2 from a position as illustrated in the lower portion of Fig. 3 to a position as illustrated in the upper portion of said figure, then, as said piston 1 advanced, in said cylinder 2, beyond the ports 11 and 13, compression would start and the combustion air charge, contained in said cylinder 2 outward of said piston 1 therein, would be forced to advance, ahead of the piston 1, and would be gradually brought up to a compression pressure, and an associated temperature, sufficient to ignite atomized fuel. During the latter portion of such compression period, or cycle of operation, the compressed air, (in the cylinder 2, outward of the piston 1, in the annular shaped space 17 located over the rim of the outward end of said piston) would be violently displaced from the space 17 into the combustion chamber 18 and would thus produce a desired turbulent disturbance, of the compressed air combustion charge, which is very beneficial and results in efficient combustion of the fuel charge, which latter (including a water charge) is injected into said compressed air combustion charge, during the period such turbulent disturbance mentioned is at its maximum, as will be described immediately hereinafter. With additional reference to Figs. 1, 4, 5 and 6, as the combustion air charge, in the cylinder 2 and combustion chamber 18 thereof, is highly compressed by the advancement of the piston 1, as previously described, it exerts itself against the small exposed inward end area surface of the reduced portion 19, of the fuel injection unit 20, and overpowers the relatively low pressure pneumatic air, normally carried in the cylindrical chamber 21, exerting itself against the relatively large, exposed outward end area surface of the enlarged head portion 22, of said fuel injection unit 20, whereupon the injection unit 20 is forced outward, away from its normal at rest position, on its conical shaped seat 23 as illustrated in Fig. 5, to a position of travel similar to that illustrated in Fig. 6 and thence to a position of travel similar to that illustrated in Fig. 1. During this forced outward movement of the fuel injection unit 20, as just described, the pressure of the pneumatic air (in the cylinder 21 and exposed to the end area surfaces of the enlarged head portion 22 of the unit 20) equalizes between the spaces outward and inward at both ends of the head or piston portion 22 via the longitudinal groove 24 which is located in the wall of cylinder 21, and thereby substantially reduces the opposition to such forced lift movement of the fuel injection unit 20 in the first part of the outward travel of such unit. Simultaneously during this first part of the outward travel of the unit 20, the liquid fuel (normally carried under pressure in the annular chamber 25) is cut-off or prevented from either entering or leaving the cylinder 26, of the injection plunger 27, via the fuel supply port 28, due to the fact that this outward travel of the unit 20 causes the said port 28, contained in said unit, to pass outward beyond the inward end of the fuel injection plunger 27, thus closing off said port 28 in a manner that can be conveniently understood by reference to Figs. 5 and 6. During the period the unit assembly 20 is being forced outward (as described previously) from its relative travel position Fig. 6 to its relative travel position, Fig. 1, the outward end of the enlarged piston portion 22, of the unit 20, passes beyond the outward end of the groove 24 (and also the end of the pneumatic air supply port 24' opening into said groove and located in the wall of the cylinder 21) and thereby closes off the communication between said groove 24 and the space outward of the piston portion 22 in the cylinder 21 and allows the said piston portion 22 to highly compress said air, outward thereof, as said unit 20 continues such outward travel. Simultaneously during this last mentioned outward travel of the unit assembly 20, an extremely high pressure is built up on the trapped fuel in the cylinder 25 due to its displacement from said cylinder by the fuel injection plunger 27, snugly fitting therein, telescoping said cylinder 26 during such outward travel of said unit assembly. This fuel, in the cylinder 26, under an extremely high pressure (as just described) exerts such pressure against the relatively small exposed stem portion of the atomizing valve unit 29 (an exposed equivalent area of the diameter of the base or smallest end of the conical shaped seat 30, of the conical shaped atomizing valve disc 31 of unit 29, in the combustion chamber end of the unit assembly 20) and overcomes the relatively low pressure (in the combustion chamber 18) exerting itself against the relatively large valve disc 31 of the unit 29 (an exposed equivalent area of the diameter of the largest end of said conical seat 30) and also overcomes the tension of the resilient spring 32 (tending to retain the disc 31 of unit 29 in contact with its seat 30) and thereupon forces said atomizing valve disc 31 to become separated (a minute distance) from its normal contact with its conical shaped seat 30 and ejects said fuel (displaced by fuel injection plunger 27) from said cylinder 26 into the combustion chamber 18. This displacement or ejection of the fuel (under a relatively high pressure) from the cylinder 26 into the combustion chamber 18 (which latter is under a comparatively low pressure), causes said fuel is generate a high velocity of flow during such injection, said flow being from said cylinder 26 via the multiple, spiral, relatively minute grooves 33 into the annular shaped groove 34 wherein said grooves 33 terminate, both of which are in the valve stem portion of the atomizing valve unit 29, thence through the minute opening, (previously mentioned) separating 31 and 30, and into said combustion chamber 18 in a minutely atomized, highly agitated, whirling spray mist, thoroughly conditioned ready for instantaneous combustion. The whirling motion of this fuel is due to said fuel being divided into several minute spiral flowing streams, in the grooves 33, which unite in the annular shaped groove 34 in a highly agitated whirling mass of minute particles which continue on through the minute opening separating 31 and 30 and are minutely atomized and thus form the whirling spray mist mentioned and occurring as said fuel is ejected from 26 and injected into 18. As this highly agitated, minutely atomized, liquid fuel is injected into the combustion chamber 18, containing (as previously mentioned) the violently turbulent and highly compressed combustion air supply charge with its associated high temperature, it is ignited and combustion starts immediately. Such combustion momentarily increases the pressure and temperature in combustion chamber 18 and increases the period of time, proportionate to the magnitude of such pressure, during which time said fuel injection will be prolonged within the volume of fuel available for each charge, the time and quantity of fuel so injected being increased with a decrease in normal pneumatic pressure and increased with an increase in normal pneumatic pressure carried in chamber 21. A decrease in the normal pressure of the pneumatic air in cylinder 21 results in a relative advance in the injection timing (of the fuel injection unit assembly 20) which in turn relatively increases the stroke travel of the fuel injection assembly 20 and thus increases the quantity of fuel charge. Likewise an increase in the normal pressure of the pneumatic air in cylinder 21 results in a relative delay or retarding in the injection timing (of the fuel injection unit assembly 20) which in turn relatively decreases the stroke travel of the fuel injection assembly 20 and thus decreases the quantity of fuel charge. An abnormal increase in the pressure of the pneumatic substance in cylinder 21 will stop the fuel injection altogether due to the fact that the normal compression pressure of the combustion air charge in chamber 18 would be insufficient to lift the assembly 20 from its seat 23. Continuing with the description of the operation of the engine, during the period the unit assembly 20 is being forced outward and the fuel injection charge is being admitted to the combustion chamber 18 (as previously described) and toward the end of such fuel injection period, the water injection unit assembly 20a (which is identical in construction, to fuel injection unit assembly 20, except having a larger diameter piston head portion 22a and injection plunger 27a) is forced outward from its normal at rest position, on its conical seat 23a, as illustrated in Fig. 5, to a position of travel similar to that illustrated in Fig. 6 and thence to a position of travel similar to that illustrated in Fig. 1 in a similar manner to the forced outward movement of the fuel injection unit assembly 20 but somewhat in delay or retard of the latter due principally to the difference in sizes mentioned. The object in this relative delay or retarding of the water injection after the fuel injection being for the purpose of allowing combustion, of the fuel and air charges, to start and to be well underway prior to the admittance of the water injection charge to the combustion chamber. It is not the intention to inject sufficient water into the products of combustion to extinguish the flame but it is the intention that the path of flow of the water shall follow the path of flow of the fuel, that sufficient water be injected to absorb the excess heat that otherwise would be lost to the water or air jacket of the cylinder, and that the quantity of water injected into the combustion chamber be varied simultaneously with and in proportion to the change in quantity of the fuel charge similarly injected thereto. During the forced outward movement of the water injection unit assembly 20a (previously being described), the pressure of the pneumatic air, in the cylinder 21a, equalizes to the spaces outward and inward at both ends of the enlarged piston head portion 22a (of the unit 20a) via the groove 24a (located in the wall of cylinder 21a) in a similar manner to that described for the fuel unit assembly 20 in the first part of the outward travel of said assembly. Simultaneously during this first part of the outward travel of the unit 20a, the water (normally carried under pressure in the annular shaped chamber 25a) is cut-off or prevented from either entering or leaving the cylinder 26a, of the water injection plunger 27a, via the water supply port 28a, due to the fact that this outward travel of the unit 20a causes the said port 28a (contained in said unit 20a) to pass outward beyond the inward end of the water injection plunger 27a, thus closing off said port 28a in a manner similar to that of the fuel injection unit assembly previously described using Figs. 5 and 6 for reference. During the period the water unit assembly 20a is continuing its outward travel from a relative travel position Fig. 6 (of the fuel unit 20) to its own relative travel position Fig. 1, the outward end of the enlarged piston portion 22a, of the unit 20a, passes beyond the outward end of the longitudinal groove 24a (and also the end of the pneumatic air supply port 24" opening into said groove and located in the wall of the cylinder 21) and thereby closes off the communication between said groove 24a and the space outward of the piston portion 22a in the cylinder 21a and allows the said piston portion 22a to highly compress said air, outward thereof, as said unit 20a continues such outward travel (in a similar manner to that previously described of fuel unit 20). Simultaneously during this last mentioned outward travel of the unit assembly 20a, an extremely high pressure is built up on the trapped water in the cylinder 26a due to its displacement from said cylinder by the water injection plunger 27a (which latter fits snugly therein) telescoping said cylinder 26a during such outward travel of said unit 20a (similar to the manner described of the fuel unit assembly 20). This water, in the cylinder 26a, under an extremely high pressure (as just described) overpowers the resilient spring 32a and the pressure (in the combustion chamber 18) both tending to retain the atomizing valve disc 31a (of the atomizing valve unit 29a) in its normal position on its conical shaped seat 30a (the latter being located in the combustion chamber end of the unit 20a) and thereupon forces the water atomizing valve disc 31a to become separated (a minute distance) from its normal contact with its conical shaped seat 30a and therethrough ejects said water (displaced by water injection plunger 27a) from said cylinder 26a into the combustion chamber 18 (in a similar manner to that previously described of the fuel unit assembly 20). This displacement or ejection of the water (under a relatively high pressure) from the cylinder 26a into the combustion chamber 18 (which latter is under considerable less pressure), causes said water to generate a high velocity of flow during such injection, said flow being from said cylinder 26a via the multiple, spiral, relatively minute grooves 33a (the adjoining ends of which are in open communication therewith) into the annular shaped groove 34a (wherein said grooves 33a terminate) (both of which are in the valve stem portion of the water atomizing valve unit 29a), thence through the minute opening (previously mentioned) separating 31a and 30a, and into said combustion chamber 18 in a minutely atomized, highly agitated, whirling spray mist, thoroughly conditioned and ready to be instantaneously flashed into steam (the whirling motion being similar to that of the fuel injection previously described). As this highly agitated, minutely atomized water charge is injected into the combustion chamber 18 during the period the combustion pressures and temperature are at their maximum in said chamber, only a minute part of a second is required to convert said water into steam, in other words it flashes into steam and then into highly superheated steam practically instantaneously, however there is a time lag between injection and complete evaporation and during this time lag period the main piston 1 passes over its outward center and starts receding in its cylinder 2 being forced inward by the products of combustion as the latter expand and displace said piston in said cylinder, said products of combustion becoming violently turbulent as they expand from the combustion chamber 18 into the annular space 17 (over the rim of the piston 1 in cylinder 2 as previously described) as said piston recedes, in said cylinder, on its inward stroke.

With reference to Figs. 1 and 3, the pneumatic air supply and control system is arranged as follows:—Pneumatic air is supplied from the power compressor 35 (which is operated from the crank shaft 5 by the cam or eccentric 36 secured thereto) to the individual pneumatic cylinders 21 and 21a of the fuel and water injector unit assemblies 20 and 20a respectively, via (as diagrammatically illustrated in Fig. 3) the tubing 37 (connected to said compressor 35) and the stop valve 38 into the accumulator tank 39, thence via said stop valve 38 and tubing 40 to the pneumatic air reducing valve 41 (which latter as its name implies, reduces the pressure of the air passing therethrough) and thence to the main pneumatic air regulating and control valve 42 (or by-passing said reducing valve 41 direct to said control valve 42, which latter is an ordinary manually operated three-way valve), thence via the tubing 43 into the combined air, fuel and water manifold fitting or fittings 44 (which latter are all connected together by three conductor manifolds or tubes 45, 46 and 47 (as illustrated in Fig. 4) for pneumatic air, fuel and water respectively which extend around the circumference of the engine), thence via the individual (main cylinder) cut-out valve 48 and port 49 (both of which are located in fitting 44) into said cylinders 21 and 21a via their respective communication ports 24' and 24". The pneumatic pump 52 (which is adapted to be operated manually) is for the purpose of supplying pneumatic air to the fittings 44, via the check valve 53 and tubing 43, when no such air is available from tank 39. The reducing valve 41 (as illustrated in detail in Fig. 10) is adjusted by the threaded adjustment screw 54 and is a means of maintaining a constant relatively reduced air pressure (compared to the higher pressure in tank 39) in the cylinders 21 and 21a of the fuel and water injection unit assemblies 20 and 20a respectively. The main pneumatic air control or engine operating valve 42, is a common three-way valve (adapted to be manually operated) wherein the rotation of the handle 42a thereof makes it possible in the first position to allow pneumatic air to flow therethrough from tubing 40 to tubing 43 (and from and to the elements connected thereto; in a second position to allow such air to flow therethrough from the reducing valve 41 to tubing 43 (and to the elements connected to the latter); and in a third position to allow such air as is in the tubing 43 (and elements connected thereto) to flow and to be released therethrough via the vent hole 42b therein to the atmosphere. The first position mentioned being for the purpose of furnishing additional pneumatic air from tank 39 to cylinders 21 and 21a so as to reduce the quantity of fuel injection and consequently the speed of the engine; the second position mentioned being for the purpose of controlling the pneumatic air supply from tank 39 to cylinders 21 and 21a via the reducing or pressure regulating valve 41 for normal steady running and operating conditions; and the third position mentioned being for the purpose of simultaneously cutting off the pneumatic air supply from tank 39 to the cylinders 21 and 21a and reducing the pressure of the pneumatic air in said cylinders when an additional quantity of fuel injection (likewise water injection) and an increase in the engine speed or power is desired.

With further reference to Figs. 1 and 3, the liquid fuel supply and control system is arranged as follows:—Liquid fuel is supplied from the fuel storage tank 55 via the fuel pump 56 to the annular shaped chamber 25 (of the fuel injection unit assembly 20) under a medium pressure, via (as diagrammatically illustrated in Fig. 3) the stop valve 57 (adjoining said tank 55) and tubing 58 into the fuel strainer 59, thence via the tubing 60 into the compounded gear type fuel pump 56 (which latter is operated from the crank shaft 5 through the worm and worm gear 61 and 62 attached to said crank shaft and the drive shaft 63 of said pump respectively), thence via the tubing 64 into the combined pneumatic air, fuel and water manifold fitting or fittings 44 (and the tubing conductor manifold 46 previously described) (the fuel in excess of the desired pressure returning to the suction side of the fuel pump 56 via the adjustable relief valve 65), thence from said fitting via the individual (main cylinder) cut-out valve 66 and port 67 (both of which are located in fitting 44) into said annular shaped chamber 25 via the latter's connecting communication port 68.

Continuing with the reference to Figs. 1 and 3, the injection water supply and control system is arranged practically identical with the fuel supply and control system and is as follows:— Water is supplied from the water storage tank 55a via the water pump 56a to the annular shaped water chamber 25a (of the water injection unit assembly 20a) under a medium pressure, via (as diagrammatically illustrated in Fig. 3) the stop valve 57a (adjoining tank 55a) and tubing 58a into the water strainer 59a, thence via the tubing 60a into the compounded gear type water pump 56a (which latter is operated off the same shaft 63 as fuel pump 56), thence via the tubing 64a into the combined pneumatic air, fuel and water manifold fitting or fittings 44 (and the tubing conductor manifold 47 previously described) (the water in excess of the desired pressure returning to the suction side of the pump 56*a* via the adjustable relief valve 65*a*), thence from said fitting 44 via the individual (main cylinder) cut-out valve 66*a* and port 67*a* (both of which are located in fitting 44) into said annular shaped chamber 25*a* via the latter's connecting communication port 68*a*.

With reference to Fig. 1, the fuel and water injection unit assemblies 20 and 20*a* respectively are mounted in a slidable manner within the detachable bonnet housing 69 which latter has a conical seat 70 and is secured thereagainst in the end of cylinder 2 (adjoining the combustion chamber 18 of the latter) by the stud bolts 71. The unit assemblies 20 and 20*a* being mounted in said housing 69 at a slight angle to one another so that the injection path of travel of the water charge will unite and follow the similar injection path of travel of the fuel charge. These unit assemblies 20 and 20*a* are provided with the snap type seal rings 72 and 72*a* which latter are mounted in said units on either side of the grooves forming their respective fuel and water chambers 25 and 25*a* and are for the purpose of preventing pressure leakage either to or from said chambers, said unit assemblies 20 and 20*a* are also provided with the snap type seal rings 73 and 73*a* mounted in the enlarged piston portions 22 and 22*a* respectively of said assemblies for the purpose of preventing pressure leakage past said piston portions except through the grooves 24 and 24*a* which latter are located in the walls of cylinders 21 and 21*a* respectively of said piston portions. The inward end of these grooves 24 and 24*a* extend within a short distance of the seats 23 and 23*a* (which latter are located at the inward ends of the cylinders 21 and 21*a*) so as to form cushioning dash pot means for the unit assemblies 20 and 20*a* respectively as said assemblies recede in said cylinders from positions of travel similar to that illustrated in Fig. 1 to a position of travel similar to that illustrated in Fig. 5, and during which travel a small quantity of pneumatic air is trapped momentarily beneath the pistons 22 and 22*a* and between the inward ends of said grooves 24 and 24*a* and said seats 23 and 23*a* and thus prevents said unit assemblies 20 and 20*a* from violently striking their respective seats 23 and 23*a* during such receding travel.

The assemblies of the fuel and water combined atomizing and agitating units 29 and 29*a* respectively, consist of plug members 74 and 74*a* which are threaded and shouldered externally and are adapted to be tightly secured into and to form the inward combustion chamber ends of the fuel and water injection assemblies 20 and 20*a* respectively, and are bored internally to fit the outer diameters of the stems 75 and 75*a* of the units 29 and 29*a* respectively and in addition thereto have the conical shaped seats 30 and 30*a* (at the combustion chamber ends of such internal bores) which fit the conical shaped valve discs 31 and 31*a* of the units 29 and 29*a* respectively, these last mentioned units have the internally threaded collars 76 and 76*a* secured thereto at the opposite ends said discs 31 and 31*a* respectively and have the resilient spring members 32 and 32*a* interposed between said collars and the ends of the threaded portions said plug members in such a manner as to tend to retain said discs 31 and 31*a* in contact with their respective seats 30 and 30*a*; the stems 75 and 75*a* of these units 29 and 29*a* have the multiple spiral grooves 33 and 33*a* respectively in the external portions thereof which latter extend from the spaces adjoining the cylinders of the injection plungers to the annular shaped grooves 34 and 34*a* adjoining the small ends of said seats 30 and 30*a* respectively. In Fig. 9 a variation in construction of the assembly of one of the fuel or water units 29 or 29*a* respectively is illustrated, wherein an apostrophe is used with like reference symbol numbers to identify similar parts and wherein the spiral grooves 33' and the annular groove 34' are in the bore of the plug member 74', also the collar 76' is pressed onto the stem 75' and the end of the latter peaned over beyond the end of said collar, this general construction would relatively strengthen the stem 75 of such unit 29. Either assembly construction of the complete unit 29 or 29*a* forms an efficient fuel or water injection charge atomizing and agitating device that may be conveniently replaced by a spare and will prove to be a highly desirable relatively inexpensive article of manufacture and merchandise.

The fuel and water injection plunger units 27 and 27*a* respectively have reduced portions forming the plungers proper on their inward ends which are sliding fits within the unit assemblies 20 and 20*a* respectively, while on their outward ends they have the enlarged externally threaded portions 27' by which they are secured and thereby made adjustable in the externally shouldered cover plugs 78 and 78*a* which latter are secured against their respective conical shaped shoulder seats 79 and 79*a* by the threaded annular shaped ferrules 80 and 80*a* and thus form the end covers for the cylinders 21 and 21*a* respectively, said cover plugs 78 and 78*a* are slightly conical on their inward ends so as to prevent the enlarged outward ends of the assemblies 20 and 20*a* respectively accidently coming in contact therewith and forming a seal joint and thus preventing said assemblies from receding in their respective cylinders 21 and 21*a*.

In Fig. 2 a variation in construction of one of the unit assemblies 20 is illustrated, wherein a resilient spring member 81 is mounted outward of and bears against the outward end of the enlarged piston portion 22 of the unit assembly 20 and with such assistance makes it possible to carry relatively less normal pressure on the pneumatic air in cylinder 21, in this variation a hollow externally threaded and shouldered and internally threaded cap member 82 is substituted in place of the usual cover plug 78 and ferrule 80, the tension on this spring 81 could be such that no air pressure would be required in cylinder 21 during full power engine operation and that only a slight air pressure, sufficient for control purposes, would be required under reduced power operations of such engine. The general construction of these unit assemblies 20 and 20*a* wherein the fuel supply chamber 25 and water supply chamber 25*a* are located between the seats 23 and 23*a* of such unit assemblies and the combustion chamber 18 forms an efficient unit of the automatic fuel or water injection type that may be conveniently replaced by a spare and will prove to be a highly desirable relatively inexpensive article of manufacture and merchandise.

The stud bolts 71 (Fig. 1) which secure the housing 69 to the cylinder body, are made of sufficient length so that it is possible (on small continuously operating engines) to close off the individual cylinder pneumatic air, fuel and water supply valves 48, 66 and 66*a* respectively and to gradually slack off on the nuts of such stud bolts 71 (in order to release the compression pressure in cylinder 2) and to thus replace the entire housing 69 or just the assemblies 20 and 20a, for this reason the manifold fitting 44 is secured in a detachable manner to said housing 69 by the bolts 83.

In the four stroke cycle type of internal combustion engine (as illustrated in Fig. 7) apostrophes are used with like reference symbol numbers to identify similar parts or that produce similar functions and wherein 20' and 20a' represent the fuel and water injection unit assemblies respectively, 18' the combustion chamber, 11' the inlet valve, 13' the exhaust valve, 1' the piston and etc.

In such an internal combustion flash steam engine as herein described, I do not claim broadly a means of either automatically injecting fuel or water into the cylinder or cylinders of such engine, but I do claim a means whereby both of such fuel and water injecting units can be controlled simultaneously external thereto and remote therefrom as one single unit and wherein the quantity of water charge of such automatic injection means automatically varies proportionate to the variation in the quantity of the fuel charge of such automatic injection means during the injection deliveries thereof and such single unit and remote control of such deliveries of such fuel and water charges to said cylinder or cylinders, and in such unit control means certain automatically operating devices or entities which make such unique remote and single unit control possible. In my experiments I have found that in introducing water efficiency into the products of combustion of such internal combustion engine, it is not only a matter of how to inject such water into such combustion but how to maintain the proper proportions of water charge to fuel charge injections thereto during variations in power and speed of such engines and also how to control simultaneously the timing and quantity of such injection charges thereto, externally and remotely therefrom, in addition to the foregoing I have found it pertinent thereto that such water charges be thoroughly conditioned, during such injection into such products of combustion, as to instantly flash evaporate into steam and thence into highly superheated steam during such injection to such cylinder or cylinders, thus preventing any water from lodging in such cylinder or cylinders as a solid or in bulk form.

The invention herein described may be manufactured and used by or for the Government of the United States of America for governmental purposes without the payment to me of any royalty thereon or therefor.

Having fully described my invention, what I claim as new and desire to secure by Letters Patent is:

1. An internal combustion cylinder fuel and water injection unit, comprising a bonnet housing, a water injector and a fuel injector extending through said housing, a common pneumatic conduit extending through said housing to both said injectors providing common control means for the feeding operations of both injectors, the fluid chamber in the water injector being definitely greater than the fluid chamber in the fuel injector whereby the operation of the water injector lags a definite period after the operation of the fuel injector.

2. An internal combustion cylinder fuel and water injection unit, comprising a bonnet housing, a water injector and a fuel injector extending through said housing, a common pneumatic conduit extending through said housing to both said injectors providing common control means for the feeding operations of both injectors, the fluid chamber in the water injector being definitely greater than the fluid chamber in the fuel injector whereby the operation of the water injector lags a definite period after the operation of the fuel injector, both said injectors extending through said bonnet housing at a slight angle to each other and having their injector nozzles directed toward a common apex within the cylinder whereby the path of the water injection will overlap the path of the fuel injection.

FRANK DAVID BUTLER.